Figure 1:
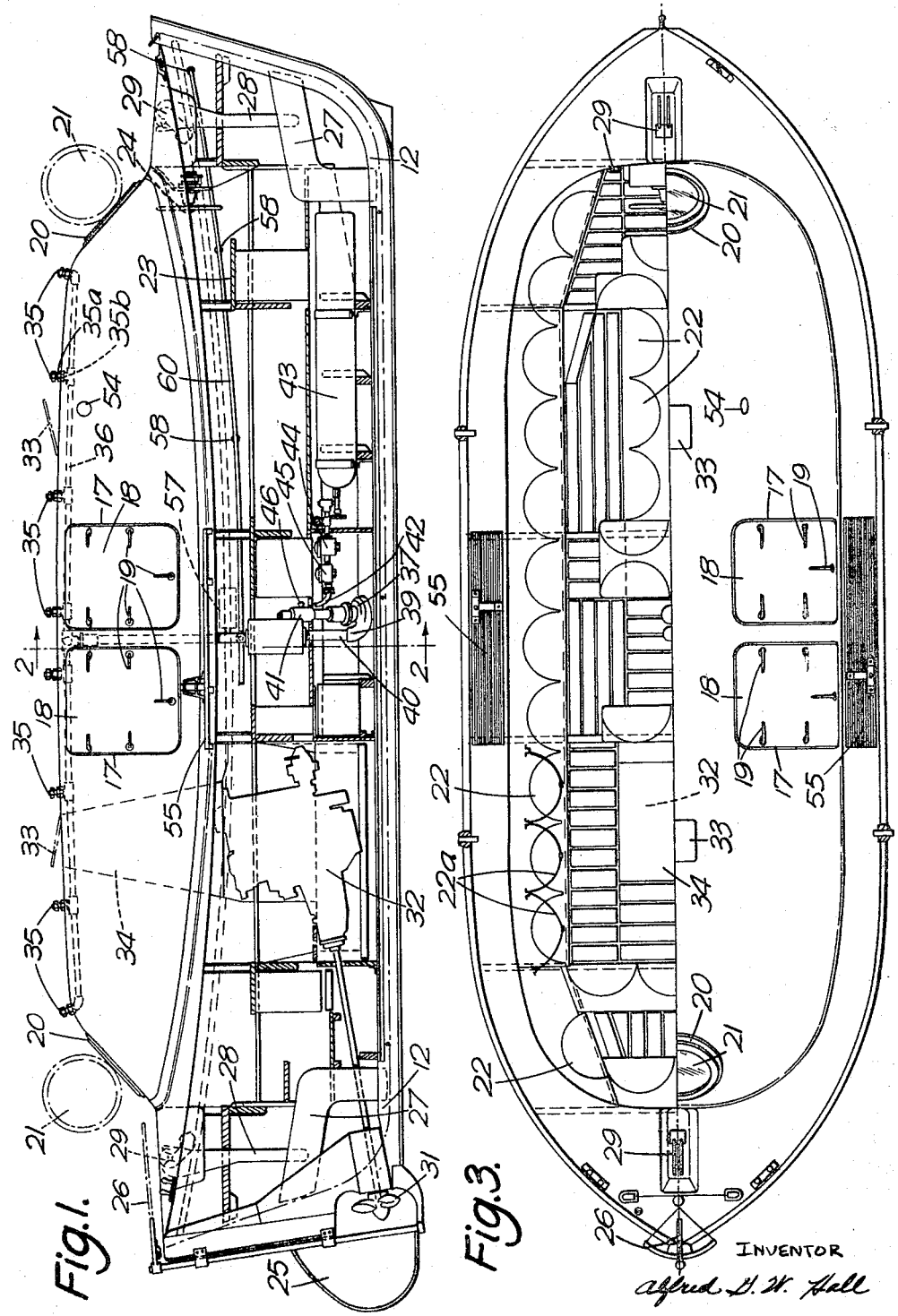

Jan. 3, 1967    A. G. W. HALL    3,295,151
HEAT RESISTANT BOATS
Filed May 24, 1965    2 Sheets-Sheet 2

INVENTOR
Alfred G. W. Hall

BY
Watson, Cole, Grindle & Watson
ATTORNEYS

United States Patent Office 3,295,151
Patented Jan. 3, 1967

3,295,151
HEAT RESISTANT BOATS
Alfred George William Hall, East Molesey, Surrey, England, assignor to Watercraft Limited, East Molesey, England, a company of Great Britain
Filed May 24, 1965, Ser. No. 458,348
7 Claims. (Cl. 9—4)

This invention relates to heat resistant boats of the kind in which the space within the hull of the boat including the passenger compartment are substantially completely enclosed, and wherein means are provided on the outside of the boat for creating a continuously flowing stream of heat insulating fluid so as to cover substantially the whoe surface of the boat above water level. Such an arrangement is particularly applicable to lifeboats for use on oil tankers, so that in the case of fire, and oil from the tanker is burning on the surface of the water, the lifeboat can be safely navigated through the flames without harm to the occupants and without damage to the boat.

According to this invention a heat resistant boat comprises a canopy over the passenger compartment so as substantially to enclose the space therein, a spray system including spray nozzle outside the boat for creating a continuous flowing stream of heat insulating fluid over substantially the whole surface of the boat above water level, a pump for delivering fluid to said nozzles, a compressed air motor driving said pump and exhausting air into the aforesaid space within the boat, a source of compressed air connected to said motor, and adjustable insulators in said canopy which may be closed for preventing the influx of said fluid.

The exhaust air from the compressed air motor may be arranged to be sufficient not only for supplying breathing air to the occupants but also for supplying air for combustion in the internal combustion engine driving the boat.

The canopy may be provided with a pressure release valve so that the pressure within said space should not build up to uncomfortable levels for the occupants.

The heat insulating fluid may comprise water or foam.

The inlet of the pump may communicate with the water outside the boat and means are provided for introducing a foaming agent into the water leaving the pump.

A compressed air reservoir for supplied air may be disposed within the boat.

The boat may be so designed as to be self righting in which case when ventilators are provided they not only incorporate means whereby they may be opened and closed by hand, they are also provided with means for automatically closing them after they have been opened by hand should the boat turn turtle.

The invention is particularly applicable to boats formed from resin bonded glass fibres and which include a roof or canopy over the passenger compartment which is joined in a fluid tight manner to the part of the hull. The roof and canopy may be formed in sections thus permitting different materials to be used for different sections. For example, the invention is applicable to a boat such as is described in British patent specifications Nos. 756,239 and 798,973 but which is provided with the aforesaid roof or canopy over the passenger compartment.

The aforesaid canopy may be provided with entry and exit openings for the occupants which openings have associated therewith doors which when closed make fluid tight engagement with the canopy. The canopy may also be provided with one or more port holes or windows secured therein in a fluid tight manner.

Horizontal platforms may also be provided on the boat outside the exit and entry openings which platforms may or may not be folding. Such an arrangement is particularly applicable where a steeply sloping deck is provided beneath said openings. Hand rails may also be provided on the roof or canopy to assist the passengers in entering and leaving the boat. The hull may also be provided with ladders beneath said openings.

The shape of the roof or canopy is such as to provide a low silhouette and maintain a low centre of gravity for the boat and to be of a rounded character of large radius.

A number of spray nozzles may be fixed at different points on the outer surface of the canopy and may communicate with a gallery pipe disposed within the canopy. Similarly a number of spray nozzles may be secured to the hull of the boat adjacent to a gunwale and fed with a gallery pipe disposed within the boat, for example around the gunwale.

The nozzles may be provided with screw threaded stems which project through holes in the roof or canopy and may be engaged by clamping nuts and sealing washers on either side thereof and are secured to branches in the gallery piples by suitable couplings.

The spread of the heat insulating fluid by the nozzles and the spacing apart of the nozzles are so selected that a continuous sheet of the heat insulating fluid is distributed over the whole surface of the roof or canopy and deck (when such is provided) and cascades over the gunwale where it may meet the water which is sprayed in a like continuous manner over the hull by the other nozzles spaced apart along the gunwale.

Figure 2:
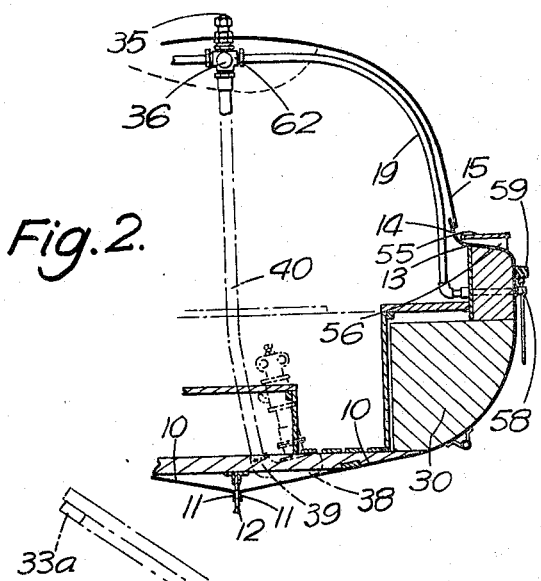
Figure 4:
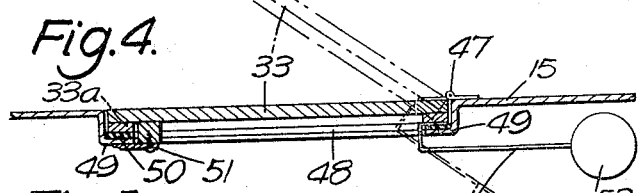
Figure 5:
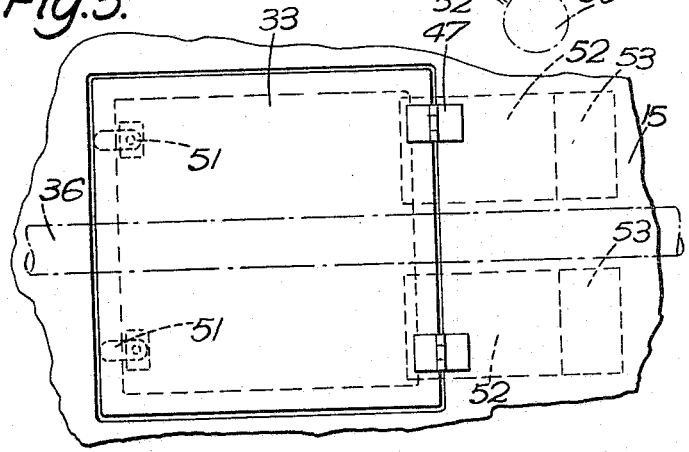

The following is a description of one construction of a heat resisting boat according to the invention, reference being made to the accompanying drawing in which:

FIGURE 1 is a part side elevation and part cross-sectional view of the boat;
FIGURE 2 is a half section on the line 2—2 of FIGURE 1;
FIGURE 3 is a half plan of the construction shown;
FIGURE 4 is a longitudinal vertical section to part of the canopy showing the ventilator; and
FIGURE 5 is a plan view of the arrangement shown in FIGURE 4.

As described in British patent specification No. 798,973 the hull of the boat is moulded from synthetic resin bonded glass fibres in two parts 10 (as best seen in FIGURE 2) which extend from stem to stern and which are provided with flanges 11 between which a keel plate 12 is clamped. The hull parts are also formed at their upper ends with an inclined deck portion 13 terminating in upwardly extending flange 14. A canopy 15 is moulded from synthetic resin bonded glass fibres in a number of parts which when secured together is so shaped and dimensioned that its lower marginal portion overlaps the aforesaid flange 14 to which it is secured by bonding or by other means.

The shape of the canopy is such as to provide a low silhouette and maintain a low centre of gravity of the boat as will be seen is of a rounded character of large radius so as to provide a minimum surface area and this contributes to the self righting properties of the boat.

As will be seen from FIGURE 1 the canopy is provided on each side thereof with two openings amidships the edges of which openings are flanged to provide doorway frames, to which doors 18 are hinged to swing inwardly about an upper horizontal axis and are held in the closed position against sealing means by door fasteners 19. The canopy is also provided at its ends with manholes 20 of circular configuration and closed by hinged windows 21 of armoured glass. Low positioned seating accommodation 22 is provided within the hull along the sides thereof together with a helmsman's seat 23 near the bows close to the steering wheel 24 which operates a rudder 25 at the stern of the boat. The seats are provided with safety belts 22(a) for retaining the passengers in their seats thus contributing the inherent self righting properties of the boat. The various controls for the engine and falls-releasing-gear are grouped near the steering wheel for use by the Helmsman. The rudder may be provided with an emergency tiller 26.

As described in British specification No. 756,239 the keel plate 12 is stiffened fore and aft by brackets 27. Extending upwardly from each bracket 27 is a lifting bar 28 constituting a part of a falls-releasing-gear 29 the upper part of which is disposed in a recess in the deck and can be operated from within the hull when it is required to release the boat from the davits.

Foam buoyancy blocks or tanks 30 are secured to parts of the hull within the boat.

The boat's propeller 31 is driven by a diesel engine 32 inside the passenger compartment. The exhaust pipe of the engine extends outside the passenger compartment and is provided in known manner with a self-closing valve which closes should the end of the exhaust pipe become submerged when the engine is not running. Disposed at the top of the canopy above the engine is a ventilator 33 which can be opened or closed in a manner described later and which when in open position tends to extract air from the interior of the boat and there may be associated with the ventilator a canopy 34 disposed over the engine so to assist in the cooling of the engine, that fumes therefrom can be extracted without entering the passengers compartment. The other ventilator is so arranged, that when open, it tends to direct air into the passengers compartment.

A number of spray nozzles 35 on the outside of the canopy extend therethrough and are fed with water from a gallery pipe 36 within the canopy near the top thereof. Similarly a number of nozzles 58 are spaced apart around the hull below the gunwale rubber 59 and are fed by further gallery pipes 60 which are fed by branch pipes 61 from a connection 62 at the upper end of the pipe 40. The spray nozzles are provided with threaded stems 35a which extend through the thickness of the canopy, and hull and receive clamping nuts 35b and sealing washers on the inner face of the canopy and hull. The spray nozzles may be provided with means for adjusting the amount of heat insulating fluid delivered. The spread of the fluid by the nozzles and the spacing apart of the nozzles are so selected that a continuous sheet of the fluid is distributed over the whole surface of the canopy and deck over which it cascades onto the sides of the hull and the sides of the hull are also protected by a film of water from the nozzles 58.

The gallery pipes are fed with water by a pump 37 in the bottom of the boat having its inlet 38 (see FIGURE 2) communicating with the water outside the boat and having its outlet 39 communicating with the upflow pipe 40. The pipe 40 extends upwardly to the inner face of the canopy and is connected at its upper end to said gallery pipe 36. Means 57 are provided for introducing a foaming agent into the water flowing through the pipe 40 thus the aforesaid heat insulating fluid distributed over the canopy and hull comprises a layer of foam. The pump is driven by a compressed air motor 41 which receives compressed air from a pipe 42 connected to a compressed air cylinder 43 lying along the bottom and which pipe is provided with a pressure reducing valve mechanism 44 and a lubricator (not shown) supplying anti freeze lubricant to the pump. The compressed air motor exhausts at 46 into the passenger compartment. When the boat is in a sea of fire the doors, port holes and the ventilators are closed so as to prevent the entry of water or foam from the sprays and the exhaust air from the compressed air motor may be sufficient for the use of the passengers and for the diesel engine, if not, an additional supply may be obtained from the compressed air cylinder.

As will be seen from FIGURES 4 and 5 the ventilator comprises a rectangular flap 33 which is hinged at 47 to the canopy 15 along one side of an opening 48 and the canopy is provided with an angular flange around the opening. A sealing gasket 50 is secured to a part 49 of the angular flange and is engaged by a stiffening flange 33a on the flap when the flap is in a closed position. The flap is provided with a number of turn buttons 51 for holding the flap in a closed position. Secured to the flap 33 is an arm 52 provided at its extremity with a weight 53, the arrangement being such that the weighted arm tends to swing the flap upwardly when the boat is on an even keel and when the turn buttons are released, whereas should the boat turn turtle the weighted arms close the flaps.

The canopy may be provided with one or more pressure release valves 54 to prevent the pressure within the boat and canopy from becoming excessive when the ventilators are closed.

A horizontal platform 55 may be supported by brackets 56 on the inclined deck portions 13 opposite the entry doors 17 in such manner that they may be folded clear of the deck when not in use.

As indicated above the shaping and area of the canopy, the low positioning of the seats and their safety belts and the low position of the engine, and the pump driven by the air motor and compressed air cylinder all contribute to the self righting properties of the boat, since the centre of gravity of the boat is disposed well below the metacentre of the boat when it is on an even keel.

I claim:
1. In a heat resisting lifeboat having a substantially enclosed passenger compartment therein and a canopy over said passenger compartment, the improvement comprising a spray system for creating a continuous flowing stream of heat insulating fluid over substantially the whole surface of the boat above water level, said spray system including spray nozzles positioned outside the boat above said canopy, a pump for delivering fluid to said nozzles, a compressed air motor for driving said pump, a source of compressed air for driving said motor, means for passing the exhaust air from the compressed air motor into said compartment within the boat, and adjustable ventilator means in said canopy to circulate air in said compartment when said spray system is not in use, said ventilator means being capable of being sealed to prevent the influx of said fluid when said spray system is in use.

2. A heat resisting boat according to claim 1 having an internal combustion engine for driving the boat, said source of compressed air being capable of providing sufficient exhaust air from the compressed air motor for supplying the internal combustion engine.

3. A heat resisting boat according to claim 1 wherein said canopy is provided with a pressure release valve to prevent build up of pressure to uncomfortable levels.

4. A heat resisting boat according to claim 1 wherein said heat insulating fluid comprises water.

5. A heat resisting boat according to claim 4 wherein the inlet of said pump communicates with the water outside the boat and foam injecting means are provided for introducing a heat insulating foaming agent into the water leaving said pump.

6. A heat resisting boat according to claim 1 wherein said ventilator means are provided with counterweight means for automatically closing the same if said boat is overturned.

7. A heat resisting boat according to claim 1 wherein is provided additional spray nozzles in said spray system on the outside of the hull of said boat.

References Cited by the Examiner

UNITED STATES PATENTS

| | | | |
|---|---|---|---|
| 1,784,819 | 12/1930 | Cochard | 9—4 |
| 1,801,480 | 4/1931 | Barnett | 9—4 |
| 2,096,167 | 10/1937 | Farrugia | 9—4 |
| 2,953,143 | 9/1960 | Kearns | 9—4 X |
| 2,991,489 | 7/1961 | Kebach | 9—4 |

FOREIGN PATENTS 756,239   9/1956   Great Britain.

OTHER REFERENCES

O.T.S. 58–279, Office of Technical Services, U.S. Dept. of Commerce, 1958, 1 page copy.

MILTON BUCHLER, *Primary Examiner.*

B. BELKIN, *Assistant Examiner.*